Aug. 26, 1947. R. G. VANDERWEIL 2,426,536
LAMINATED HEAT EXCHANGE FIN
Filed July 7, 1944 3 Sheets-Sheet 1

HIGH CONDUCTIVITY (COPPER)
LOW CONDUCTIVITY (STEEL)

INVENTOR
RAIMUND G. VANDERWEIL
By Seymour, Earle & Nichols
ATTORNEYS

Aug. 26, 1947.   R. G. VANDERWEIL   2,426,536
LAMINATED HEAT EXCHANGE FIN
Filed July 7, 1944   3 Sheets-Sheet 2
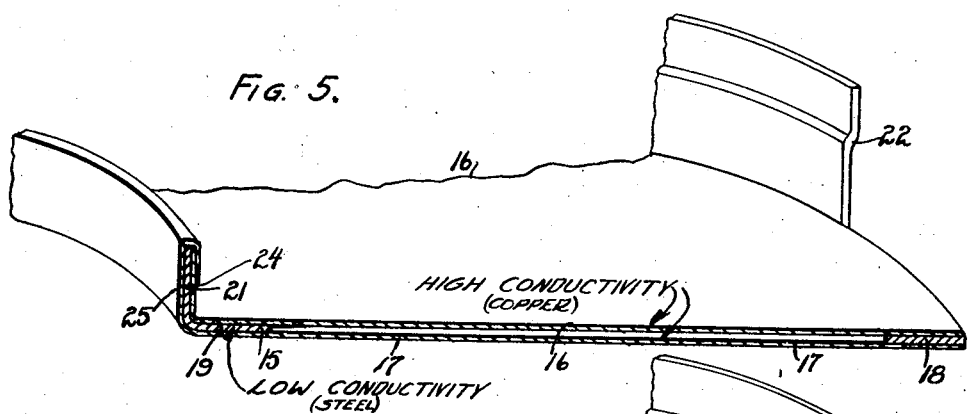
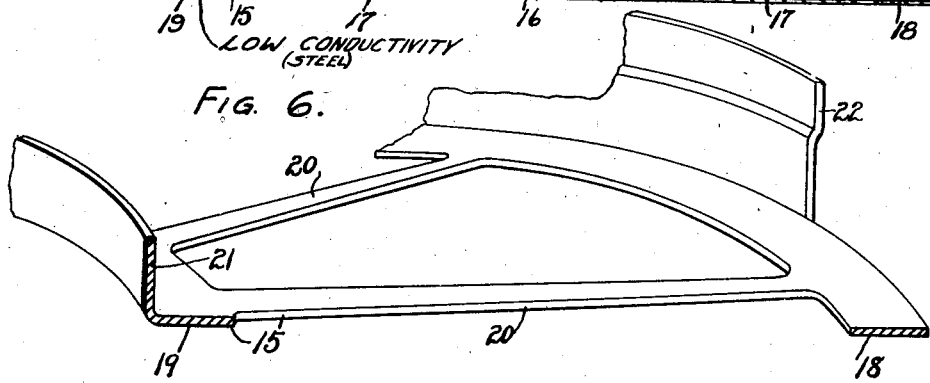
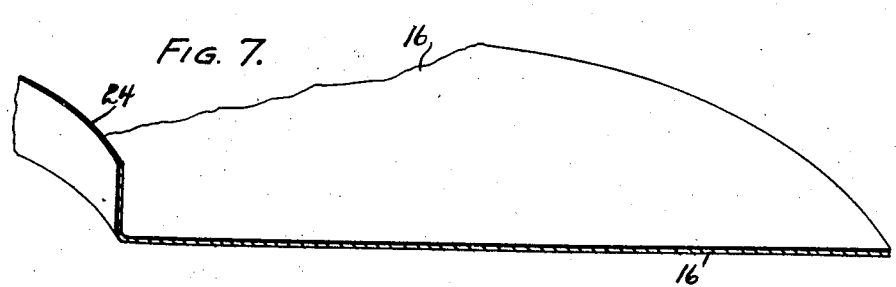
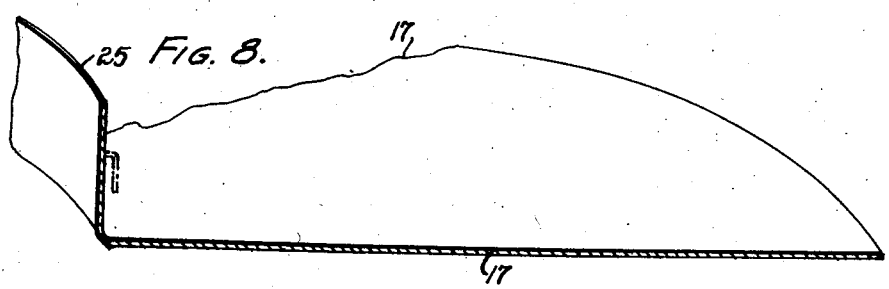
INVENTOR
RAIMUND G. VANDERWEIL
By Seymour, Earle + Nichols
ATTORNEYS

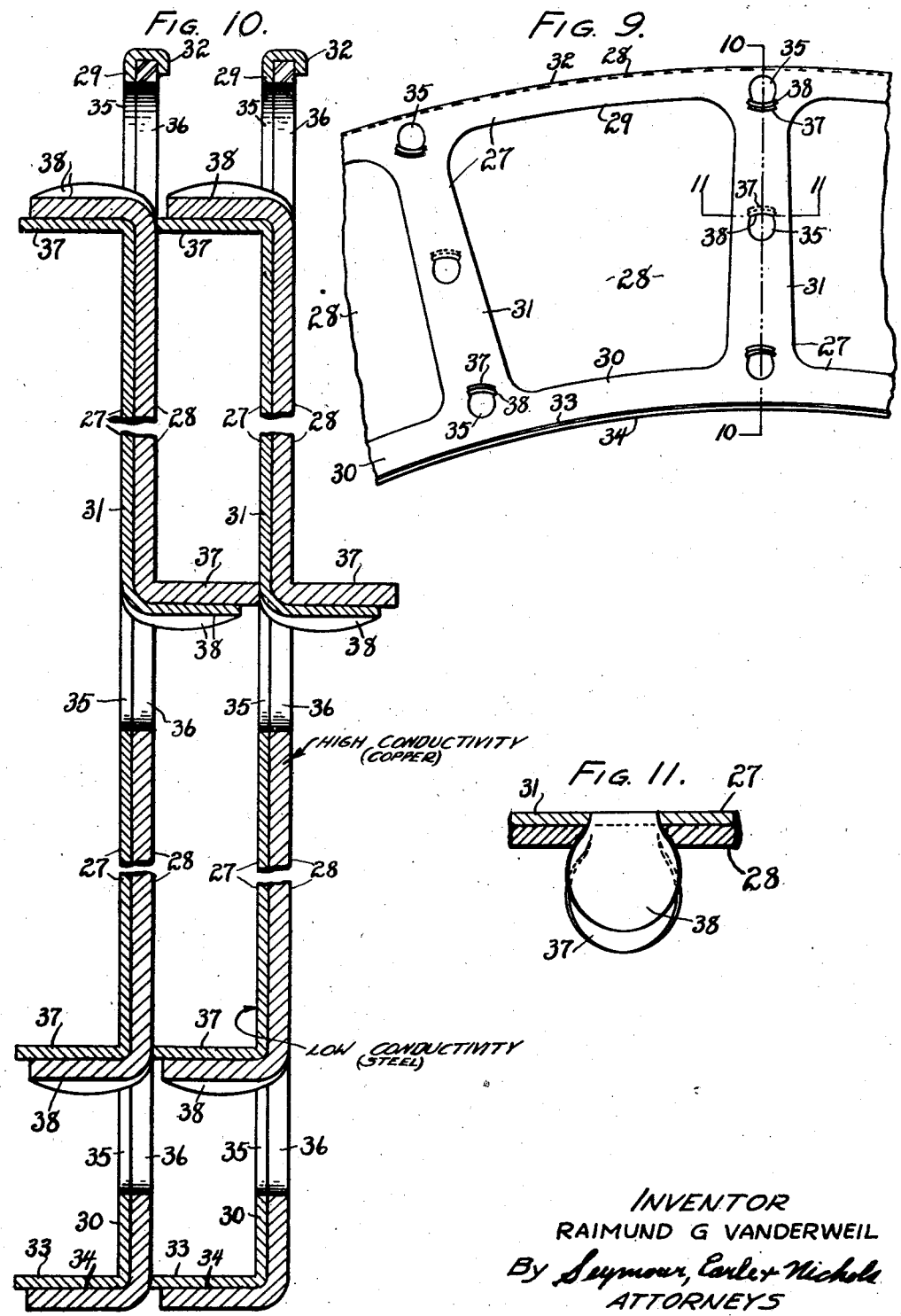

Patented Aug. 26, 1947

2,426,536

UNITED STATES PATENT OFFICE 2,426,536

LAMINATED HEAT-EXCHANGE FIN

Raimund G. Vanderweil, Woodbury, Conn., assignor to Chase Brass & Copper Co. Incorporated, Waterbury, Conn., a corporation Application July 7, 1944, Serial No. 543,881

3 Claims. (Cl. 257—261)

The present invention relates to improvements in heat-exchange fins and relates more particularly to laminated heat-exchange fins, i. e., heat-exchange fins composed of a plurality of layers or laminations. The heat-exchange fins of the present invention are especially well suited for use in effecting the cooling of the cylinders or other parts of air-cooled internal combustion engines.

One of the objects of the present invention is to provide a superior laminated heat-exchange fin combining high strength and minimum bulk with rapid and effective heat dissipation.

Another object of the present invention is to provide an efficient laminated heat-exchange fin combining thinness with adequate strength to withstand the stresses imposed by high-velocity air streams or the like.

Still another object of the present invention is to provide a superior laminated heat-exchange fin so constructed and arranged as to coact with an adjacent heat-exchange fin to effect mutual stabilization.

A further object of the present invention is to provide a superior laminated heat-exchange fin which will not unduly warp as a result of being subjected to high temperatures.

A still further object of the present invention is to provide a superior heat-exchange fin of the character referred to which may be produced at a low cost for manufacture.

In the accompanying drawings, in which certain modes of carrying out the present invention are shown for illustrative purposes:

Fig. 5 is a fragmentary perspective view of a portion of one of the laminated fins shown in the preceding figures;

Fig. 6 is a similar view of the supporting-plate thereof;

Fig. 7 is a view of the same general character as Figs. 5 and 6 but showing a portion of the upper heat-transfer plate, detached;

Fig. 8 is a similar view of the lower heat-transfer plate, detached;

Fig. 9 is a fragmentary top or plan view of a portion of a laminated heat-exchange fin of the present invention but of modified form;

Fig. 10 is a broken transverse sectional view on an enlarged scale taken on the line 10—10 of Fig. 9; and Fig. 11 is a broken detail sectional view taken on the line 11—11 of Fig. 9.

Figure 1:
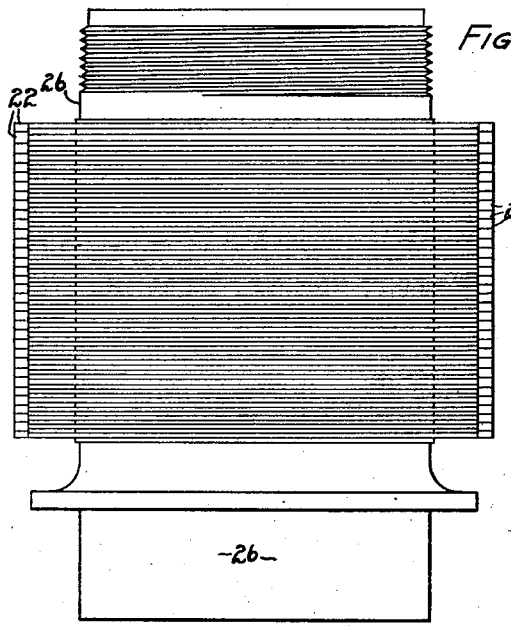
Fig. 1 is a view in side elevation of the cylinder of an air-cooled aircraft engine equipped with laminated heat-exchange fins constructed in accordance with the present invention.

The structure of Figs. 1 to 8 inclusive

The particular three-layer laminated heat-exchange fin shown in Figs. 1 to 8 inclusive, includes what might be aptly termed a "supporting-plate or -member" generally designated by the reference character 15, and two heat-transfer plates or members respectively generally designated by the reference characters 16 and 17.

The supporting-plate 15 above referred to is of ring-like form and is skeletonized so as to result in the formation of an outer margin-portion 18 and an inner margin-portion 19 integrally interconnected by a plurality of spoke-like bridging-portions or -arms 20, which latter, in the instance shown, extend substantially radially, though not necessarily so.

Figure 2:
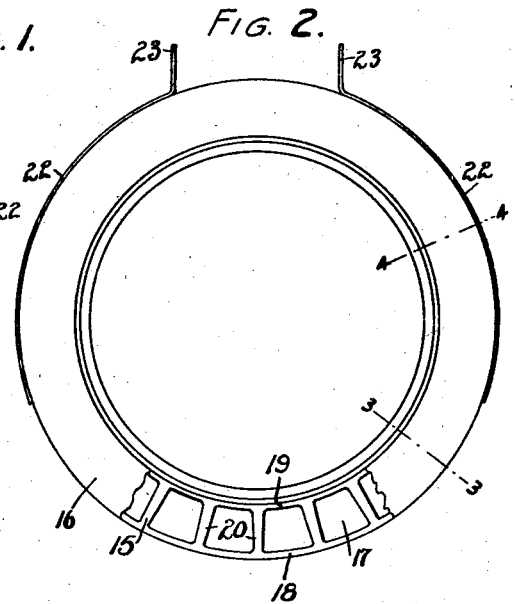
Fig. 2 is a top or plan view thereof with the upper heat-transfer plate of the uppermost fin partly broken away.

At its inner edge, the supporting-plate 15 is turned or bent so as to extend substantially perpendicularly with respect to the plane of the main portion of the said plate, to provide a stiffening-flange 21 integral with the inner margin-portion 19. Portions of the outer perimeter of the outer margin-portion 18 are bent to provide a pair of substantially-perpendicular baffle-flanges 22—22, each of which extends about one-quarter way around the outer perimeter of a given supporting-plate 15 and each of which has an end 23 turned outwardly away from the supporting-plate, as indicated in Fig. 2.

The aforesaid supporting-plate 15 may be formed of any suitable sheet material having the characteristics at elevated temperatures of relatively-high modulus of elasticity, high tensile strength (and hence high flexural-strength) combined with relatively-low heat-conductivity as compared to the material of which the aforesaid heat-transfer plates 16 and 17 or their equivalent, are formed. Among the many sheet materials suitable for producing the supporting-plate may be mentioned high carbon steel (about 0.95% C), silicon bronze, nickel and nickel alloys, stainless steel, etc.

Like the supporting-plate 15, the heat-transfer plates 16 and 17 may be formed of sheet material, but having characteristics at elevated temperatures of a relatively-low modulus of elasticity and relatively-high heat-conductivity, as compared to the material of which the aforesaid supporting-plate 15 is formed. Suitable materials for the said heat-transfer plates are numerous, among which may be mentioned copper, silver, and aluminum.

Figure 3:
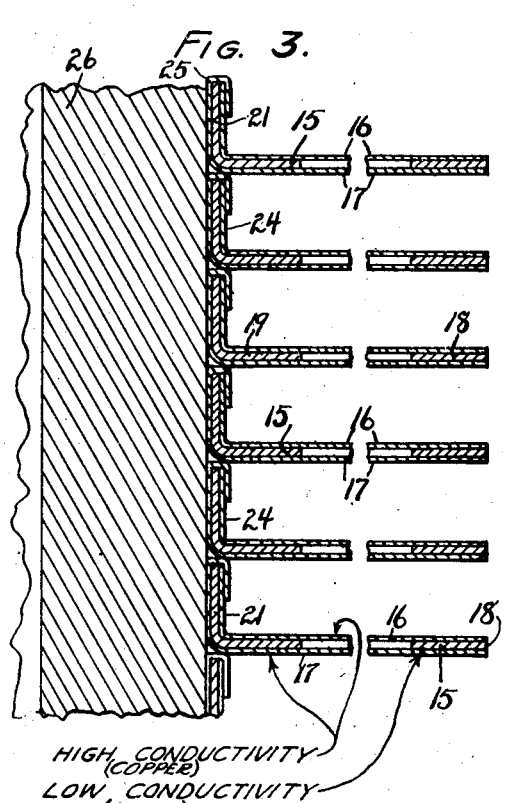
Fig. 3 is a broken sectional view on an enlarged scale taken on the line 3—3 of Fig. 2.
Figure 4:
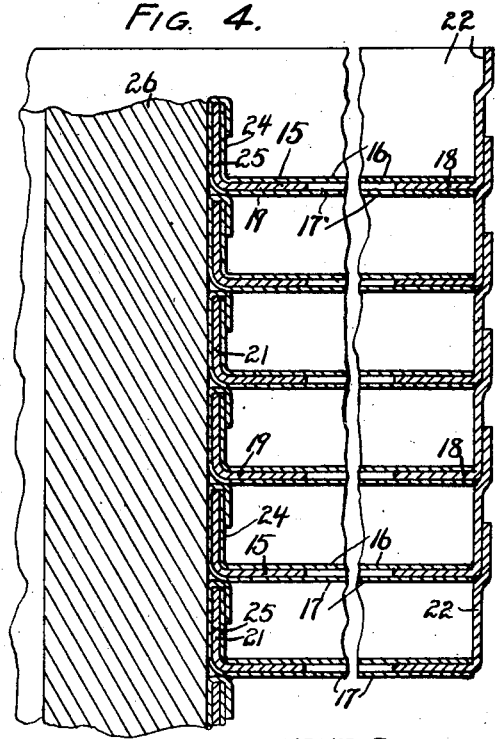
Fig. 4 is a similar view taken on the line 4—4 of Fig. 2.

The upper heat-transfer plate 16 in the instance shown, includes an inner substantially-perpendicular flange 24 which lies against the outer face of the stiffening-flange 21 of the supporting-plate 15, as is especially well shown in Figs. 3, 4 and 5. The lower heat-transfer plate 17 is likewise formed with a substantially-perpendicular flange 25 extending along the inner face of the stiffening-flange 21 of the supporting-plate 15, and having its upper portion bent outwardly across the upper edge of the said stiffening-flange and thence downwardly against the outer face of the flange 24 of the upper heat-transfer plate 16.

The heat-transfer plates 16 and 17 may be secured to the respective opposite faces of the supporting-plate 15 in any suitable manner such, for instance, as by spot-welding, brazing, silver soldering, or the like.

When a group of laminated heat-exchange fins such as have been above described, are assembled onto an engine-cylinder 26 or the like, the baffle-flanges 22 thereof will nest together, if desired, in a manner such as is shown in Fig. 4, and will serve to deflect air currents around the rear part of the cylinder 26 to ultimately flow outwardly through the passage between the straight portions 23—23 of the said baffle-flanges. The air currents are thus caused to cool the rear portions of the cylinder.

If desired, the laminated heat-exchange fins of the present invention may be provided after assembly of their respective component elements, with an allover coating or plating of corrosion-resisting material such, for instance, as nickel, tin, silver, chrome, or other materials having high resistance to corrosion and scaling at elevated temperatures or having the characteristic of having thin oxide coatings formed thereon which serve to check further corrosion.

The structure of Figs. 9, 10 and 11

The laminated heat-exchange fin illustrated in Figs. 9, 10 and 11 includes a supporting-plate generally designated by the reference character 27, together with a heat-transfer plate generally designated by the reference character 28. Like the supporting-plate 15 of the previously-described structure, the supporting-plate 27 is skeletonized and includes an outer margin-portion 29 and an inner margin-portion 30 integrally interconnected by a plurality of spoke-like arms or bridging-portions 31. The outer extremity of the outer margin-portion 29 of the supporting-plate 27 is bent around the outer edge of the heat-transfer plate 28 in the form of a clamping-rim 32, as is especially well shown in Fig. 10.

The material at the inner edge of the inner margin-portion 30 of the supporting-plate 27 is bent or turned so as to extend substantially perpendicularly with respect to the plane of the said plate, to provide a stiffening-flange 33, which also serves to aid in the spacing of an adjacent laminated heat-exchange fin, as is clearly shown in Fig. 10. The material at the inner edge of the heat-transfer plate 28 is also bent perpendicularly to form an inner flange 34 extending in contact with the inner face of the stiffening-flange 33 of the supporting-plate 27.

The supporting-plate 27 is characterized by relatively-high modulus of elasticity and relatively-low heat-conductivity at elevated temperatures, as compared to the material of the heat-transfer plate 28. The said supporting-plate may be formed of sheet material such, for instance, as those described in connection with the supporting-plate 15. Conversely, the heat-transfer plate 28 or its equivalent, is characterized, when at elevated temperatures, by having a relatively-low modulus of elasticity and a relatively-high heat-conductivity, as compared to the material of which the aforesaid supporting-plate 27 is formed. Suitable materials for the constitution of the heat-transfer plate 28 have been previously described in connection with the description of the heat-transfer plates 16 and 17.

For the double purpose of coupling the plates 27 and 28 together and holding adjacent fins in spaced relationship, both of the said plates may be provided at desired intervals, with substantially-circular piercings 35 and 36 respectively in such manner that the material displaced from the said piercings is integrally connected to the plate from which it is bent, along a relatively-short arc, to provide spacing-fingers 37 and coupling-fingers 38.

As will be noted by reference to Fig. 10 in particular, the material of the laminated fin displaced as the result of the piercings 35 and 36 above referred to, is in one direction in some instances and in an opposite direction in other instances. When a given piercing operation is made from the side of the fin on which the supporting-plate 27 is located, such piercing operation results in the formation of a coupling-finger 38 integral with the said supporting-plate, and a spacing-finger 37 integral with the heat-transfer plate 28. Due to the direction of piercing, the spacing-fingers 37 are longer than the coupling-fingers 38. Conversely, when a given piercing operation is made from the direction of the face of the fin upon which the heat-transfer plate 28 is located, the coupling-fingers 38 are integral with the said plate 28, while the resulting taller spacing-fingers 37 are integral with the supporting-plate 27.

When a given spacing-finger 37 and a complemental coupling-finger 38 are simultaneously bent after suitably piercing the fin, the coupling-finger is so deflected that it crowds the walls of the piercing from which it results, and by a virtual wedging action, interlocks the elements 27 and 28, as is especially well shown in Fig. 11.

When the above-described two-ply heat-exchange fin is in use, the inner edges of the margin-portions 29 and 30 and the edges of the arms 31 thereof will cause sufficient turbulence in the cooling fluid to aid in the transference of heat from the face of the heat-transfer plate 28 which faces toward the supporting-plate 27.

The fins may be attached to a cylinder or the like by a shrinking or pressing process, or by fusing with silver-solder or preferably with alloys of lower fusion temperatures.

The particular mode of securing the plies of the heat-exchange fin together is set forth and claimed in my copending application Ser. No. 545,464, filed July 18, 1944.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A laminated heat-exchange fin, including in combination: a ring-like skeletonized supporting-plate formed of sheet material of relatively-high strength and relatively-low heat-conductivity as compared to the material of the hereinafter-mentioned ring-like heat-transfer plate, the said skeletonized supporting-plate having a plurality of perforations extending therethrough from face to face and having substantially the same extent and internal and external shape as the latter; and a ring-like heat-transfer plate secured to one face of the said ring-like skeletonized supporting-plate and extending over the perforations therein, the said heat-transfer plate being provided at its inner perimeter with a substantially-perpendicular flange extending into the interior opening of the ring-like supporting-plate in close proximity to the inner periphery thereof and having its inner face exposed for direct heat-transfer engagement with the wall of an engine-cylinder or the like, the said ring-like heat-transfer plate and its said flange being formed of sheet material of relatively-low strength and relatively-high heat-conductivity as compared to the material constituting the aforesaid ring-like skeletonized supporting-plate; whereby the inner peripheral portion of the said supporting-plate serves to retain the flange of the heat-transfer plate against the wall of a cylinder or the like.

2. A laminated heat-exchange fin, including in combination: a ring-like skeletonized supporting-plate formed of sheet material of relatively-high strength and relatively-low heat-conductivity as compared to the material of the hereinafter-mentioned heat-transfer plate and formed at its inner edge with a substantially-perpendicular stiffening-flange, the said skeletonized supporting-plate having a plurality of perforations extending therethrough from face to face and having substantially the same extent and internal and external shape as the latter; and a heat-transfer plate secured to one face of the said skeletonized supporting-plate and extending over the perforations therein, the said heat-transfer plate being provided at its inner edge with a substantially-perpendicular flange extending into the interior opening of and overlapping the substantially-perpendicular flange of the said skeletonized supporting-plate and having its inner face exposed for direct heat-transfer engagement with the wall of an engine-cylinder or the like, the said heat-transfer plate and its said flange being formed of sheet material of relatively-low strength and relatively-high heat-conductivity as compared to the material constituting the aforesaid skeletonized supporting-plate; whereby the flange of the said supporting-plate serves to retain the flange of the heat-transfer plate against the wall of a cylinder or the like.

3. A laminated heat-exchange fin, including in combination: a ring-like skeletonized supporting-plate formed of sheet material of relatively-high strength and relatively-low heat-conductivity as compared to the material of the hereinafter-mentioned heat-transfer plates, the said skeletonized supporting-plate having a plurality of perforations extending therethrough from face to face and having substantially the same extent and internal and external shape as the latter; and a pair of heat-transfer plates respectively secured to the opposite faces of the said skeletonized supporting-plate and both extending over and respectively forming closures for the opposite sides of the said perforations in the said supporting-plate, both of the said heat-transfer plates being formed of sheet material of relatively-low strength and relatively-high heat-conductivity as compared to the aforesaid supporting-plate; one of the said heat-transfer plates being provided at its inner perimeter with a substantially-perpendicular flange extending into the interior opening of the ring-like supporting-plate in close proximity to the inner periphery thereof and having its inner face exposed for direct heat-transfer engagement with the wall of an engine-cylinder or the like; whereby the inner peripheral portion of the said supporting-plate serves to retain the flange of one of the said heat-transfer plates against the wall of a cylinder or the like.

RAIMUND G. VANDERWEIL.

REFERENCES CITED

The following references are of record in the file of this patent:

UNITED STATES PATENTS

| Number | Name | Date |
| --- | --- | --- |
| 1,693,520 | Kondo | Nov. 27, 1928 |
| 2,184,345 | Hersey | Dec. 26, 1939 |
| 2,271,131 | Price | Jan. 27, 1942 |
| 1,659,920 | Murray | Feb. 21, 1928 |
| 1,788,474 | Trane | Jan. 13, 1931 |
| 1,898,028 | Bennett | Feb. 21, 1933 |
| 2,085,041 | Reigart et al. | June 29, 1937 |
| 2,368,403 | Barnes | Jan. 30, 1945 |
| 1,806,186 | Trane | May 19, 1931 |

FOREIGN PATENTS

| Number | Country | Date |
| --- | --- | --- |
| 607,459 | France | July 2, 1926 |